United States Patent
Katayama

(10) Patent No.: US 7,218,957 B2
(45) Date of Patent: May 15, 2007

(54) BLUETOOTH TERMINAL

(75) Inventor: Mutsumi Katayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 208 days.

(21) Appl. No.: 11/012,203

(22) Filed: Dec. 16, 2004

(65) Prior Publication Data

US 2005/0135297 A1 Jun. 23, 2005

(30) Foreign Application Priority Data

Dec. 18, 2003 (JP) .............................. 2003-420750

(51) Int. Cl.
*H04M 1/05* (2006.01)
*H04B 5/00* (2006.01)

(52) U.S. Cl. ............... 455/569.1; 455/41.2; 455/569.2; 455/575.2

(58) Field of Classification Search ............ None
See application file for complete search history.

(56) References Cited

U.S. PATENT DOCUMENTS

| 7,027,774 | B2* | 4/2006 | Kuon ...................... 455/41.2 |
| 2002/0111140 | A1* | 8/2002 | Kim ........................ 455/41 |
| 2002/0198031 | A1* | 12/2002 | Holmes et al. ............. 455/569 |
| 2003/0224778 | A1* | 12/2003 | Oosawa ...................... 455/423 |

FOREIGN PATENT DOCUMENTS

| EP | 1 213 896 A1 | 6/2002 |
| EP | 1 261 176 A1 | 11/2002 |
| EP | 1 367 562 A2 | 12/2003 |
| EP | 1 372 299 A1 | 12/2003 |
| JP | 62-155535 U | 10/1987 |
| JP | 2001-148657 A | 5/2001 |
| WO | WO-2005/029825 A1 | 3/2005 |

* cited by examiner

*Primary Examiner*—Erika A. Gary
(74) *Attorney, Agent, or Firm*—Birch, Stewart, Kolasch & Birch, LLP

(57) ABSTRACT

A Bluetooth terminal, relay, and system for determining a network configuration automatically and for transferring to an optimal waiting state. A Bluetooth terminal is provided with a profile functioning as a headset for communicating a terminal on the partner side via a voice gateway terminal, includes an input key for accepting an input operation including a transmitting operation, a receiving operation, and a call termination operation. A waiting state selecting member is provided for selecting a waiting state to be transferred upon call termination from a first waiting state in which an SCO link is disconnected and an ACL link is maintained, a second waiting state in which the SCO link and the ACL link are both disconnected. The waiting state selecting member selects the first waiting state after communication without input key operation being terminated, and selects the second waiting state after communication with input key operation being terminated.

19 Claims, 5 Drawing Sheets

| CASES | HEADSET OPERATION | ESTIMATING WHETHER A RELAY TERMINAL EXISTS OR NOT | SPECIFICATION | WAITING STATE |
|---|---|---|---|---|
| 1 | WITHOUT | EXISTING | | SECOND WAITING STATE |
| 2 | | | BOTH SCO AND ACL ARE DISCONNECTED UPON CALL TERMINATION | |
| 3 | WITH | NON-EXISTING | SCO IS DISCONNECTED UPON CALL TERMINATION, BUT ACL IS MAINTAINED | FIRST WAITING STATE |
| 4 | | | | SECOND WAITING STATE |

FIG. 5

BLUETOOTH TERMINAL

CROSS-REFERENCE TO RELATED APPLICATIONS

The present application is related to Japanese Patent Application No. 2003-420750 filed on Dec. 18, 2003 the entire contents of which are hereby incorporated by reference.

BACKGROUND OF THE INVENTION

1. Field of the Invention

The present invention is directed to providing a Bluetooth terminal, a Bluetooth relay, and a Bluetooth system that can determine a network configuration of the Bluetooth automatically and transfer to an optimal waiting state.

2. Description of Background Art

A communication system (intercom) which enables wireless communication between riders driving on two-wheel vehicles with each including a relay terminal on the vehicles and a headset including a speaker, a microphone, and a transceiver provided on a helmet of the rider so that a rider and a passenger on the same vehicle, or riders on the different vehicles can communicate each other by air via the relay terminals is disclosed in Microfilm in JP-UM-A-62-155535.

In addition, JP-A-2001-148657 also discloses a technology in which a Bluetooth is mounted to a headset and a portable phone so that the riders of two-wheel vehicles can communicate via the portable phones in a hands-free manner and the portable phones are remote-controlled from the headsets. By mounting a relay terminal having a remote control function in the vicinity of a throttle grip of the vehicle and mounting the Bluetooth in the relay terminal, the rider can remote control the portable phone from the relay terminal which is superior in operability than the head set.

In the Bluetooth, there are defined two types of connections as a physical RF link; a Synchronous Connection Oriented: SCO and Asynchronous Connectionless: ACL. The SCO link is a point-to-point link of a call connection type created between a master and a specific slave, and is used mainly for transferring voice data. One single master can have three SCO links at a maximum to the same slave or different slaves. The ACL link connects between a master in one Piconet and all the active slaves in a packet switching manner. The master can switch the packet with a given slave in a slot unit using a slot which is not reserved for the SCO link. The ACL link is mainly used for data transfer.

In a Bluetooth system, if a reduction in power to be consumed in respective wireless terminals is wanted, it is preferable to disconnect an ACL link together with the disconnection of an SCO link when transferring to a waiting state after having terminated communication through the SCO link. On the other hand, in the Bluetooth system, when establishing a new SCO link, the link can be established in a shorter time from the waiting state in which the ACL link is established than from the waiting state in which the ACL link is not established.

Under such an environment wherein only a headset 11 and a portable phone 12 exist as the Bluetooth system as shown in FIG. 1, and there exists no vehicle-mounted relay terminal, the rider can access the portable phone 12 by operating the headset 11 directly. Therefore, the headset 11 can response immediately to the operation of the rider, and can generate a response sound which indicates that the operation is accepted.

In contrast, as shown in FIG. 2, in a system configuration in which a vehicle-mounted relay terminal 13 is interposed, and all the operations are performed from the relay terminal 13, operating sounds in response to the operation performed to the relay terminal 13 are sent to the headset 11 using the SCO link. Therefore, there arises a technological problem in which there exists a time lag in the generation of the operating sounds in response to the operation of the relay terminal 13 that is done by the rider unless the ACL link is established between the relay terminal 13 and the headset 11.

If the headset 11 can recognize whether a terminal on the partner side is the portable phone 12 or the vehicle-mounted relay terminal 13, such a technological problem can be solved by employing such a control that the ACL link is disconnected together with disconnection of the SCO link when the terminal on the partner side is the portable phone 12, and the ACL link is not disconnected even when the SCO link is disconnected when the terminal on the partner side is the relay terminal 13.

However, as is well known in the Bluetooth technology, the respective terminals identify the type or the function of the terminal on the partner side by a connection profile mounted on the terminal on the partner side. Thus, since only a multi-purpose headset profile or a hands free profile is mounted as the connection profile which enables communication with the headset in the relay terminal and the portable phone, it is difficult to recognize that the terminal on the partner side is either the portable phone 12 or the vehicle-mounted relay terminal 13 by the headset 11.

SUMMARY AND OBJECTS OF THE INVENTION

It is an object of the present invention to solve the above-described problem in the related art, and to provide a Bluetooth terminal, a Bluetooth relay, and a Bluetooth system which can determine a network configuration of the Bluetooth automatically and transfer to an optimal waiting state.

In order to achieve the above-described object, the invention provides a Bluetooth terminal provided with a profile functioning as a headset for communicating a terminal on the partner side via a voice gateway terminal, including an input key for accepting an input operation including a transmitting operation, a receiving operation, and a call termination operation, and waiting state selecting means for selecting a waiting state to be transferred upon call termination from a first waiting state in which an SCO link is disconnected and an ACL link is maintained, and a second waiting state in which the SCO link and the ACL link are both disconnected. The waiting state selecting means selects the first waiting state after communication without input key operation is terminated, and selects the second waiting state after communication with input key operation is terminated.

According to the configuration described above, the following effects are achieved.

When presence or absence of the vehicle-mounted relay terminal is estimated based on whether or not the transmitting operation, receiving operation, or call termination operation has been performed for the input key of the headset and if the vehicle-mounted relay terminal does not exist, and hence it is estimated that it is not necessary to maintain the ACL link between the headset and the voice gateway terminal, the ACL link is also disconnected simultaneously with disconnection of the SCO link. Thus, wasteful consumption of power for maintaining the ACL link is prevented.

(2) Even when it is estimated that the transmitting operation, receiving operation, or call termination operation are not performed for the input key of the headset and the vehicle-mounted relay terminal exists, if disconnection of the ACL link is requested from the voice gateway terminal when communication is terminated, disconnection is performed without maintaining the ACL link, while the link is maintained only when disconnection of the ACL link is not requested from the voice gateway terminal, control giving a priority to the specification of the vehicle-mounted relay terminal is enabled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a drawing showing a selection reference of a waiting state.

DETAILED DESCRIPTION OF THE PREFERRED EMBODIMENTS

Figure 1:
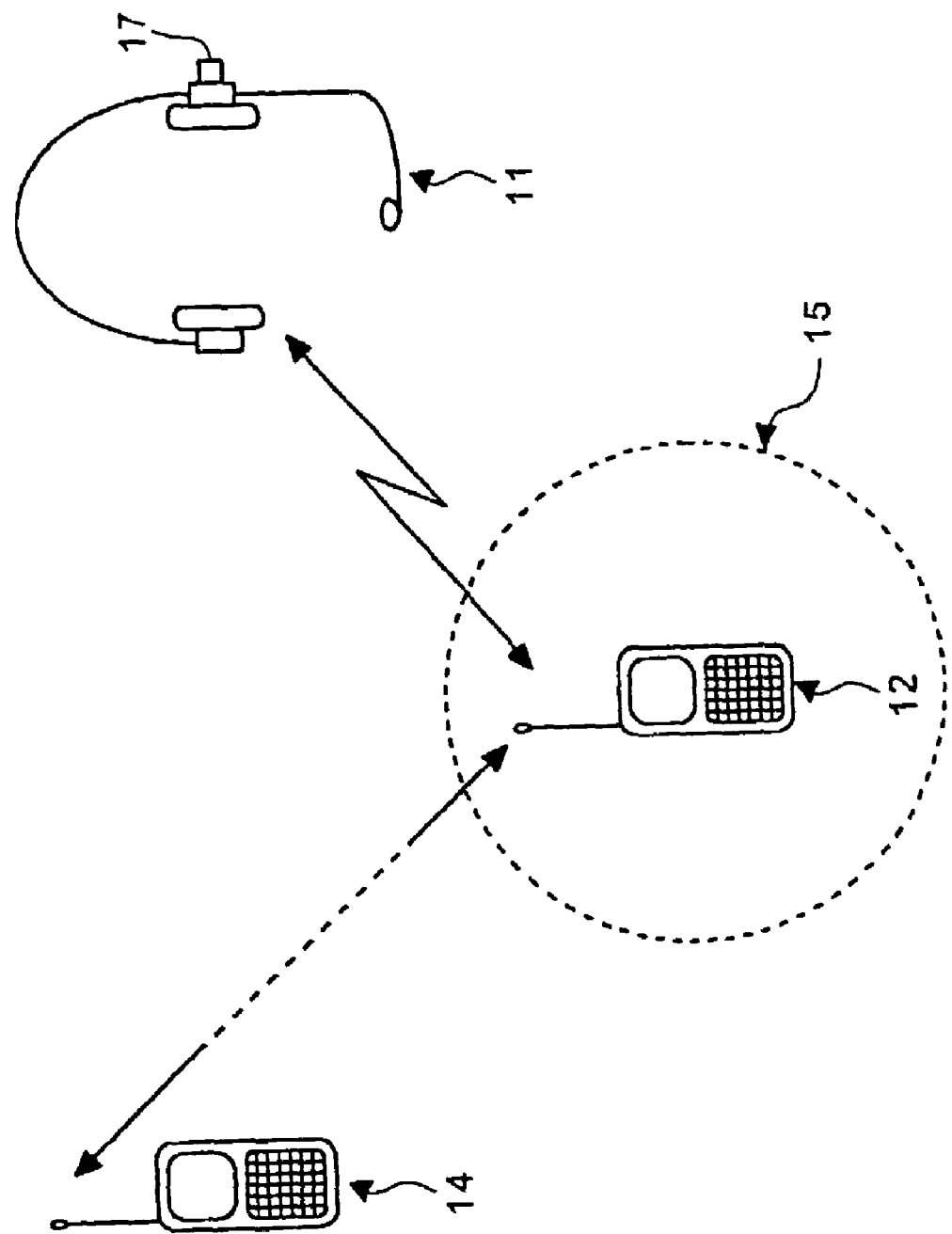
FIG. 1 is a drawing of a Bluetooth system including only a headset 11 and a portable phone 12.
Figure 2:
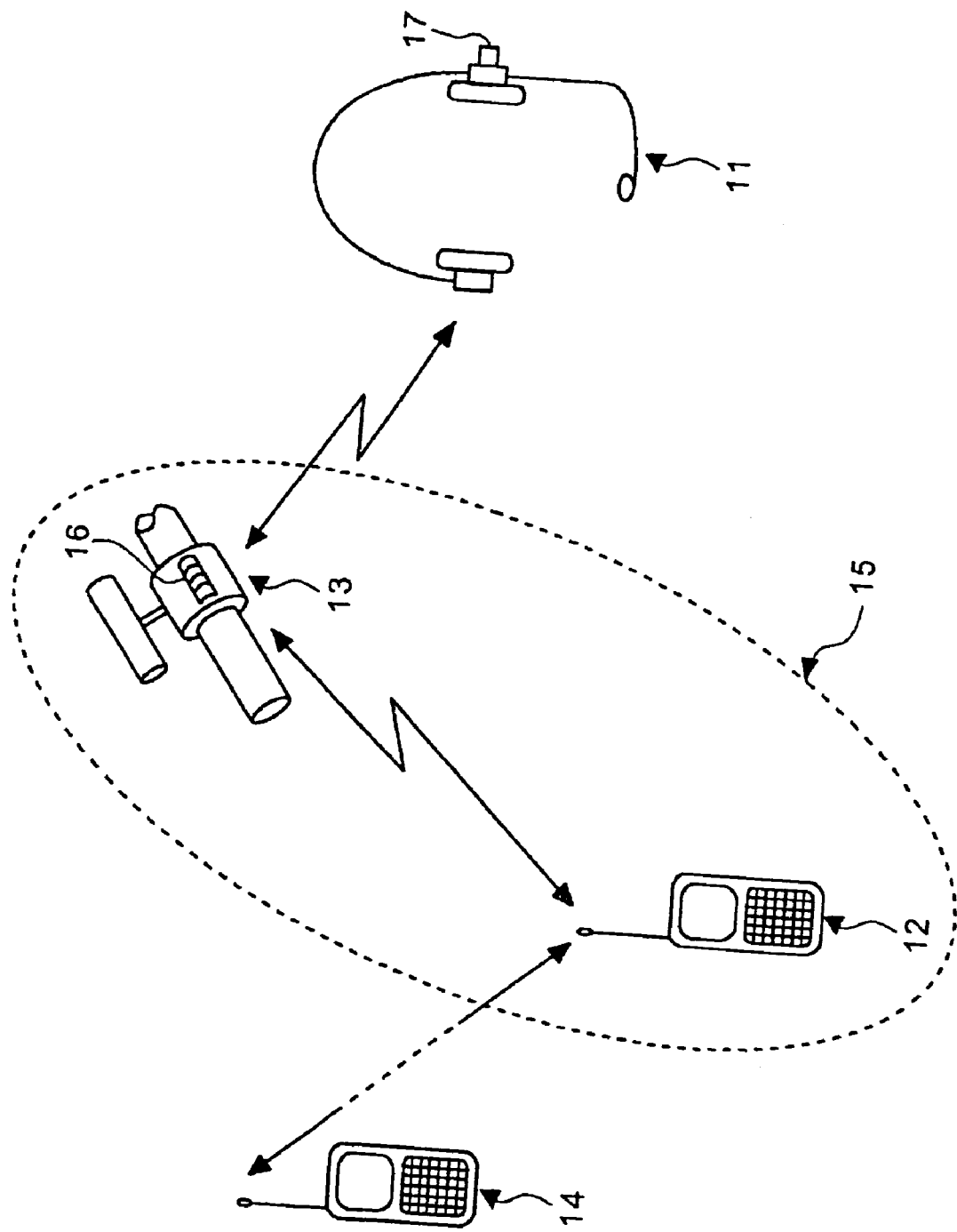
FIG. 2 is a drawing of the Bluetooth system including the headset 11, the portable phone 12, and a vehicle-mounted relay terminal 13.

Referring to the drawings, a preferred embodiment of the invention will be described. FIG. 1 is a drawing showing a configuration of a Bluetooth system to which the invention is applied, including a headset 11 that a rider (a driver or a passenger) wears and a portable phone 12 having a voice gateway function. As shown in FIG. 2, another embodiment is disclosed wherein a vehicle-mounted terminal 13 is provided which has a voice gateway function that is mounted on a vehicle for relaying a Bluetooth communication. The above-described headset 11, the portable phone 12, and the gateway terminal 13 each include a Bluetooth mounted thereon, and perform mutual wireless communication using an ISM band of 2.4 GHz.

The above-described vehicle-mounted relay terminal 13 is mounted, for example, in the vicinity of the proximal side of a hand grip, and is provided with various input keys 16 including an electronic volume key. The headset 11 is also provided with an input key 17 for remote-controlling the portable phone 12. With the Bluetooth, the headset 11 cannot identify whether the terminal on the partner side is the portable phone 12 or the vehicle-mounted relay terminal 13. Thus, the portable phone 12 and the vehicle-mounted relay terminal 13 provided with the voice gateway function may be generally represented by a "gateway terminal 15."

When the Bluetooth system is configured only by the headset 11 and the portable phone 12 as shown in FIG. 1, for example, a headset profile is mounted as a common profile for both of them. When the Bluetooth system further includes the vehicle-mounted relay terminal 13 as shown in FIG. 2, it is not necessary to mount the profile common for the headset 11 and the portable phone 12. A profile which is equivalent to the profile mounted respectively to the headset 11 and the portable phone 12 must simply be mounted to the vehicle-mounted relay terminal 13.

Figure 3:
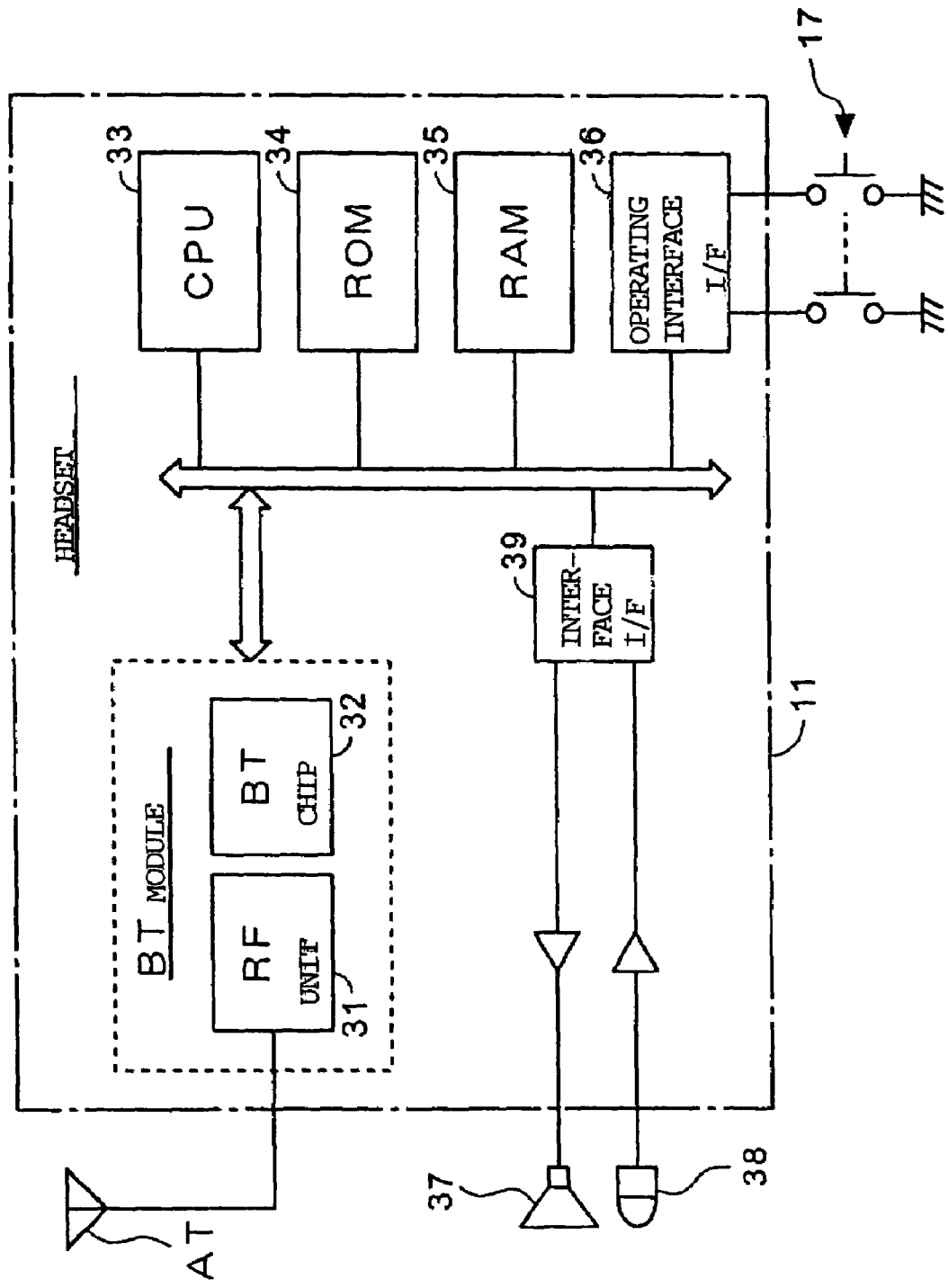
FIG. 3 is a block diagram of the headset 11.
Figure 4:
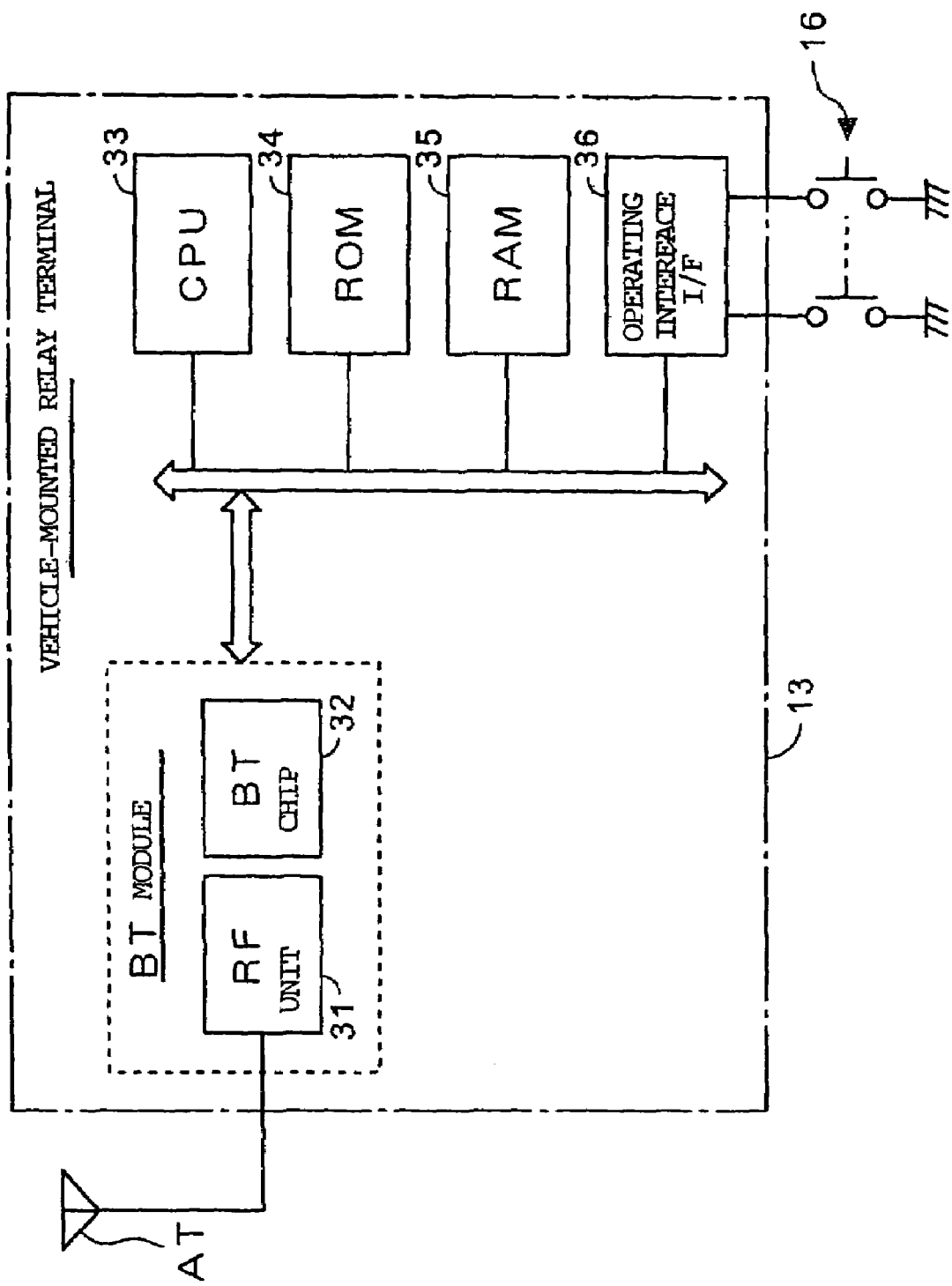
FIG. 4 is a block diagram of the vehicle-mounted relay terminal 13.

FIG. 3 is a block diagram of the aforementioned headset 11. FIG. 4 is a block diagram of the vehicle-mounted relay terminal 13. Both drawings only show the configuration necessary for the description of the invention.

A CPU 33 executes various processes according to a program stored in a ROM 34. A RAM 25 provides a work area for storing data or the like temporarily when the CPU 33 executes various processes. An operating interface 36 is connected to the various input keys 17 (16). A BT module, the CPU 33, the ROM 34, the RAM 35 and the interface 36 are connected to each other via a common bus. The headset 11 shown in FIG. 3 further includes a speaker 37, and a microphone 38, which are connected to the common bus via an I/O interface 39.

The BT module mainly includes an RF unit 31 and a BT chip 32. The BT chip 32 executes a process for establishing inter-Piconet synchronization with respect to the terminal on the partner side, or coding/decoding process or the like of the transmitting and receiving signals. In other words, the respective BT modules digital-modulate carrier signals by the transmitting data upon transmission, and spread spectrum is effected to the modulated carrier signals by frequency hopping. Thereafter, the transmitting signal, after having amplified to a level of transmission output which is equal to or smaller than a prescribed value, is transmitted from an antenna AT to the wireless terminal on the partner side. Wireless signals from the wireless terminal on the partner side are received via the antenna AT, then inverse spread spectrum is effected, and then digital decoding is executed.

In such a configuration, the portable phone 12 is stored in a pocket of the clothes of the rider or in a bag which he/she brings with him/her. It is not necessary to operate the portable phone 12 directly even when the rider calls the communication partner using the portable phone 12. Therefore, as shown in FIG. 1, when the system configuration without the vehicle-mounted relay terminal 13 is employed, the portable phone 12 is remote-controlled through the operation of the input key 17 of the headset 11. The ACL link of the Bluetooth is used for the remote control. When the communication line is established between the portable phone 12 and a terminal of the communication partner 14, the communication is performed using the SCO link of the Bluetooth established between the headset 11 and the portable phone 12.

In contrast, as shown in FIG. 2, when the system configuration with the vehicle-mounted relay terminal 13 is employed, the portable phone 12 is remote-controlled by the operation of the input key 16 of the vehicle-mounted relay terminal 13 which has superior operability than the headset 11. The ACL link of the Bluetooth is utilized for the remote control. When the communication line is established between the portable phone 12 and the terminal of the communication partner 14, communication is performed utilizing the SCO link of the Bluetooth established among the headset 11, the vehicle-mounted relay terminal 13 and the portable phone 12.

Likewise, when there is an incoming call to the portable phone 12, if the system configuration without the vehicle-mounted relay terminal 13 (FIG. 1) is employed, the portable phone 12 is remote-controlled from the headset 11 and communication is started. When the system configuration (FIG. 2) including the vehicle-mounted relay terminal 13 is employed, the portable phone 12 is remote-controlled from the vehicle-mounted relay terminal 13 which is superior in operability to the headset system 11 and hence communication is started.

In this manner, remote-control the portable phone 12 via the headset 11 for transmission from the portable phone 12 is an operational specific for the system configuration without a vehicle-mounted relay terminal 13. In addition, remote control of the portable phone 12 by the vehicle-mounted relay terminal 13 is an operational specific for the system configuration including the vehicle-mounted relay terminal 13.

Likewise, when the portable phone 12 received an incoming call or terminated the call, remote control of the portable phone 12 by the headset 11 is an operational specific for the system configuration without the vehicle-mounted relay terminal 13. In addition, remote control of the portable phone 12 by the vehicle-mounted relay terminal 13 is an operational specific for the system configuration including the vehicle-mounted relay terminal 13.

Therefore, according to the invention, the system configuration is estimated according to which terminal is operated upon incoming call or call termination, and based on the result of this estimation, the headset 11 selects the waiting state after communication.

FIG. 5 is a drawing showing a selection reference of the waiting state according to the invention. In the invention, the waiting state is classified into "a first waiting state" in which the SCO link is disconnected, but the ACL link is maintained, and "a second waiting state" in which both the SCO link and the ACL link are disconnected, so that the ACL disconnection request is not sent from the headset in the first waiting state even when transferred to an audio connection mode, or an intercom communication mode. Thereafter, the headset 11 is transferred to the first or second waiting state according to the selection reference described in detail below.

When the procedure of transmission, reception, and termination of a call is performed without operating the input key 17 of the headset 11, it is estimated that the vehicle-mounted relay terminal 13 exists, and a priority is given to a request from the vehicle-mounted relay terminal 13. For example, the following two cases are conceivable.

Case 1: When an incoming call is received by the gateway terminal 15 and then the SCO and the ACL are disconnected by the gateway terminal 15 together with call termination, or when a request for disconnection is received from the gateway terminal 15, the state is transferred to the second waiting state.

Case 2: When the incoming call is received by the gate way terminal 15, and then the SCO is disconnected, but the ACL is maintained by the gateway terminal 15 together with call termination, the state is transferred to the first waiting state.

When the input key 17 of the headset 11 is operated and the incoming or outgoing call or call termination procedure is performed, it is estimated that the vehicle-mounted relay terminal 13 does not exist. For example, the following two cases are considered.

Case 3: When the incoming call is received by the gateway terminal 15 and then the call is terminated by the operation of the input key of the headset 11, the SCO disconnection request and the ACL disconnection request are sent to the gateway terminal 15 (the portable phone 12 in this case) and the state is transferred to the second waiting state.

Case 4: When the transmission request is given from the headset 11 to the gateway terminal 15, the state is transferred to the second waiting state irrespective of whether the call termination is performed on the headset 11 or the gateway terminal 15.

In this manner, according to the invention, the presence or absence of the vehicle-mounted relay terminal is estimated based on which one of the transmitting operation, receiving operation or call termination operation is performed for the input key 17 of the headset 11, and when it is estimated that the vehicle-mounted relay terminal 13 does not exist and hence it is not necessary to maintain the ACL link between the headset 11 and the voice gateway terminal 15 (Case 3, 4), the ACL link is disconnected simultaneously with the disconnection of the SCO link. Thus, wasteful power consumption for maintaining the ACL link is prevented.

Also, according to the invention, even when it is estimated that the transmitting operation, receiving operation, or call termination operation is not performed for the input key 17 of the headset 11, and the vehicle-mounted relay terminal 13 exists (1, 2), if a disconnection of the ACL link is requested from the voice gateway terminal upon call termination (Case 1), a disconnection is accepted without maintaining the ACL link, and the line is maintained only when the disconnection of the ACL link is not requested from the voice gateway terminal (Case 2), whereby link control giving a priority to the specification of the vehicle-mounted relay terminal 13 is enabled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bluetooth terminal provided with a profile functioning as a headset for communicating a terminal on a partner side via a voice gateway terminal, comprising:
   an input key for accepting an input operation including a transmitting operation, a receiving operation, and a call termination operation; and
   waiting state selecting means for selecting a waiting state to be transferred upon call termination from a first waiting state in which an SCO link is disconnected and an ACL link is maintained or a second waiting state in which the SCO link and the ACL link are both disconnected,
   wherein the waiting state selecting means selects the first waiting state after communication without input key operation being terminated, and selects the second waiting state after communication with the input key operation being terminated.

2. The bluetooth terminal according to claim 1, wherein the waiting state selecting means transfers the waiting state to the second waiting state even after communication without input key operation is terminated in case 1 shown below:
   case 1: when incoming call is received by the voice gateway terminal and then the SCO link and the ACL link are disconnected by the voice gateway terminal together with call termination.

3. The bluetooth terminal according to claim 1, wherein the waiting state selecting means transfers the waiting state to the first waiting state in case 2 shown below:
case 2: when the incoming call is received by the voice gateway terminal, and then the SCO is disconnected but the ACL is maintained by the voice gateway terminal together with call termination.

4. The bluetooth terminal according to claim 1, wherein the waiting state selecting means transfers the waiting state to the second waiting state in case 3 and case 4 shown below:
case 3: when the incoming call is received by the voice gateway terminal and then the call is terminated by the operation of the input key;
case 4: when the transmission is made by the operation of the input key.

5. The bluetooth terminal according to claim 1, wherein the input key is operatively connected to a headset and wherein the input key is operated and the incoming or outgoing call or call termination procedure is performed, the second waiting state is selected.

6. The bluetooth terminal according to claim 1, wherein the input key is operatively connected to a vehicle-mounted relay terminal and wherein the input key is operated and the incoming or outgoing call or call termination procedure is performed, the first waiting state is selected.

7. The bluetooth terminal according to claim 6, wherein the vehicle-mounted relay terminal is disposed in the vicinity of the proximal side of a hand grip of a motorcycle.

8. The bluetooth terminal according to claim 6, wherein an ACL link is initially established between the vehicle-mounted relay terminal and the headset and an SCO link is established between a portable phone, the vehicle-mounted relay terminal and the headset when communication is performed.

9. The bluetooth terminal according to claim 1, wherein the bluetooth terminal is operatively connected to each of a portable phone, a gateway terminal and the headset.

10. The bluetooth terminal according to claim 1, wherein the SCO link is established between a portable phone and the headset.

11. A bluetooth terminal functioning as a voice gateway terminal for relaying communication between a headset and a portable phone comprising:
an input key for accepting an input operation;
a first profile for communicating with the portable phone;
a second profile for communicating with the headset; and
link control means for controlling an SCO link and an ACL link to be established with respect to the headset according to an input operation;
wherein when the communication between the portable phone and the headset is terminated, the link control means disconnects the SCO link and maintains the ACL link with respect to the headset,
wherein the input key is operatively connected to a headset and wherein the input key is operated and the incoming or outgoing call or call termination procedure is performed, a second waiting state is selected wherein the SCO link and the ACL link are both disconnected.

12. The bluetooth terminal according to claim 11, and further including a waiting state selecting means for transferring a waiting state to a second waiting state wherein the SCO link and the ACL link are both disconnected even after communication without input key operation is terminated in case 1 shown below:
case 1: when incoming call is received by the voice gateway terminal and then the SCO link and the ACL link are disconnected by the voice gateway terminal together with call termination.

13. The bluetooth terminal according to claim 11, and further including a waiting state selecting means for transferring the waiting state to a first waiting state wherein the SCO link is disconnected and the ACL link is maintained in case 2 shown below:
case 2: when the incoming call is received by the voice gateway terminal, and then the SCO is disconnected but the ACL is maintained by the voice gateway terminal together with call termination.

14. The bluetooth terminal according to claim 11, and further including a waiting state selecting means for transferring the waiting state to a second waiting state wherein the SCO link and the ACL link are both disconnected in case 3 and case 4 shown below:
case 3: when the incoming call is received by the voice gateway terminal and then the call is terminated by the operation of the input key;
case 4: when the transmission is made by the operation of the input key.

15. The bluetooth terminal according to claim 11, wherein the Bluetooth terminal is operatively connected to each of a portable phone, the voice gateway terminal and the headset.

16. The bluetooth terminal according to claim 11, wherein the SCO link is established between a portable phone and the headset.

17. A bluetooth terminal functioning as a voice gateway terminal for relaying communication between a headset and a portable phone comprising:
an input key for accepting an input operation;
a first profile for communicating with the portable phone;
a second profile for communicating with the headset; and
link control means for controlling an SCO link and an ACL link to be established with respect to the headset according to an input operation;
wherein when the communication between the portable phone and the headset is terminated, the link control means disconnects the SCO link and maintains the ACL link with respect to the headset,
wherein the input key is operatively connected to a vehicle-mounted relay terminal and wherein the input key is operated and the incoming or outgoing call or call termination procedure is performed, a first waiting state is selected wherein the SCO link is disconnected and the ACL link is maintained.

18. The bluetooth terminal according to claim 16, wherein the vehicle-mounted relay terminal is disposed in the vicinity of the proximal side of a hand grip of a motorcycle.

19. The bluetooth terminal according to claim 17, wherein an ACL link is initially established between the vehicle-mounted relay terminal and the headset and an SCO link is established between a portable phone, the vehicle-mounted relay terminal and the headset when communication is performed.

* * * * *